(12) United States Patent
Gao

(10) Patent No.: US 7,243,581 B1
(45) Date of Patent: Jul. 17, 2007

(54) FIXED TORQUE LIMITING DRIVER

(75) Inventor: Hua Gao, Fox Point, WI (US)

(73) Assignee: Bradshaw Medical, Kenosha, WI (US)

( * ) Notice: Subject to any disclaimer, the term of this patent is extended or adjusted under 35 U.S.C. 154(b) by 0 days.

(21) Appl. No.: 11/471,308

(22) Filed: Jun. 20, 2006

(51) Int. Cl.
| | |
|---|---|
| B25B 23/14 | (2006.01) |
| B25B 23/157 | (2006.01) |
| B25B 23/142 | (2006.01) |
| B25B 23/159 | (2006.01) |
| F16D 7/00 | (2006.01) |
| F16D 23/00 | (2006.01) |
| F16D 43/20 | (2006.01) |

(52) U.S. Cl. .................. 81/473; 81/467; 81/478; 81/480; 192/54.52; 192/38; 192/45

(58) Field of Classification Search ............... 81/467, 81/473–476, 478, 480; 192/38, 44, 45, 54.52, 192/56.62
See application file for complete search history.

(56) References Cited

U.S. PATENT DOCUMENTS

| | | | |
|---|---|---|---|
| 1,566,553 A | 12/1925 | Maisch | |
| 1,860,871 A | 5/1932 | Pouliot | |
| 2,332,971 A | 10/1943 | Johnson | |
| 2,802,354 A | 8/1957 | Bohnhoff et al. | |
| 3,167,936 A * | 2/1965 | Enquist | 464/36 |
| 3,168,944 A | 2/1965 | Livermont | |
| 3,277,670 A | 10/1966 | Bent | |
| 3,277,671 A | 10/1966 | Winstone et al. | |
| 3,305,058 A | 2/1967 | Orwin et al. | |
| 3,542,162 A * | 11/1970 | Durnell et al. | 188/134 |
| 3,613,751 A | 10/1971 | Juhasz | |
| 3,653,226 A | 4/1972 | Westbury | |
| 3,702,546 A | 11/1972 | Schnepel | |
| 3,942,337 A | 3/1976 | Leonard et al. | |
| 4,041,729 A | 8/1977 | Bilz | |
| 4,668,206 A | 5/1987 | Fukumoto | |
| 4,712,456 A | 12/1987 | Yuan | |
| 5,035,311 A | 7/1991 | Girguis | |
| 5,054,588 A | 10/1991 | Thorp et al. | |
| 5,156,244 A | 10/1992 | Pyles et al. | |
| 5,356,350 A | 10/1994 | Schreiber | |
| 5,383,818 A | 1/1995 | Lessat-Kaupat et al. | |
| 5,505,676 A | 4/1996 | Bookshar | |
| 6,132,435 A | 10/2000 | Young | |
| 6,312,339 B1 * | 11/2001 | Beyert | 464/30 |
| 6,640,674 B1 | 11/2003 | Rinner et al. | |
| 6,990,877 B1 | 1/2006 | Wu | |

* cited by examiner

Primary Examiner—Joseph J. Hail, III
Assistant Examiner—Bryan Muller
(74) Attorney, Agent, or Firm—Ryan, Kromholz, and Manion S.C.

(57) ABSTRACT

A clutch assembly for use with a torque limiting driver. The clutch assembly comprises two relatively rotatable clutch plates, a driving plate and a camming plate, that face one another, with a plurality of rolling members housed between the two members. The driving clutch member has a face comprising a plurality of radially spaced flat areas and a plurality of recesses interposed between the flat areas, with the recesses comprising a curvilinear base area. The second camming clutch member has a face comprising a plurality of radially spaced flat areas and a plurality of opposing downwardly sloped planar surfaces interposed between said flat areas, with the planar surfaces forming an angle. The rolling members are movable from an engaged position with the clutch members to an override position. When the rolling members are in the override position, the recesses form individual housings for the rolling members that include a gap located between the rolling members and a respective curvilinear base area.

9 Claims, 6 Drawing Sheets

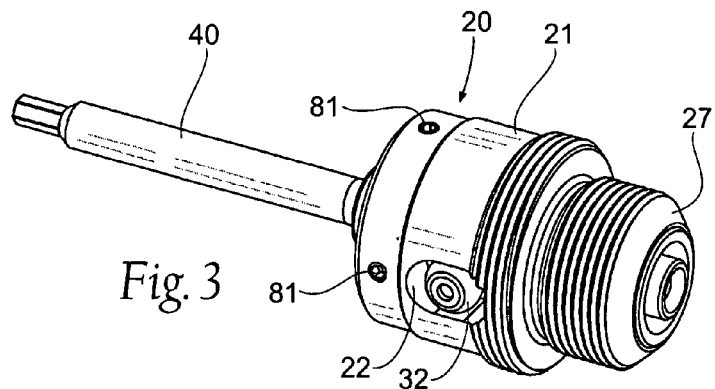
Fig. 3
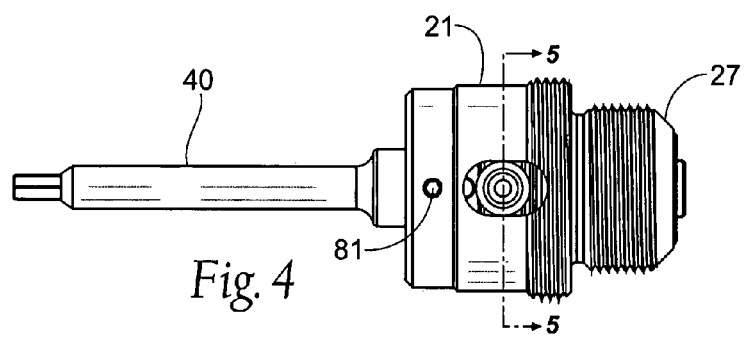
Fig. 4
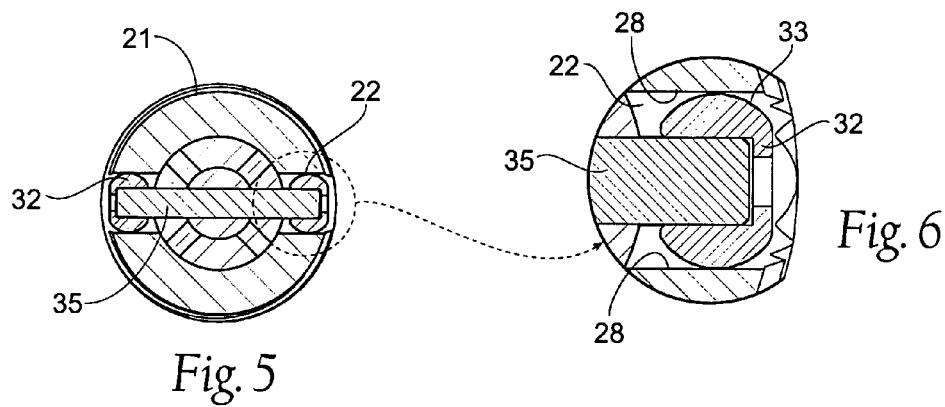
Fig. 5
Fig. 6
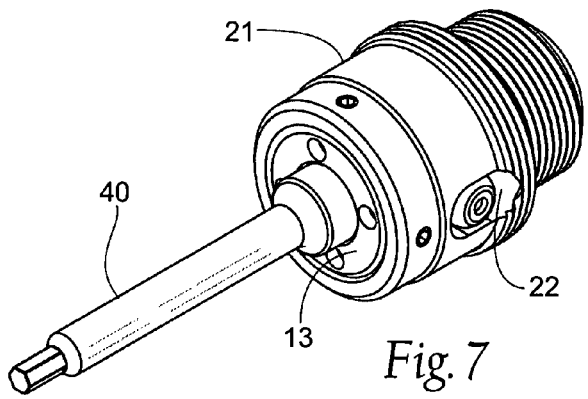
Fig. 7

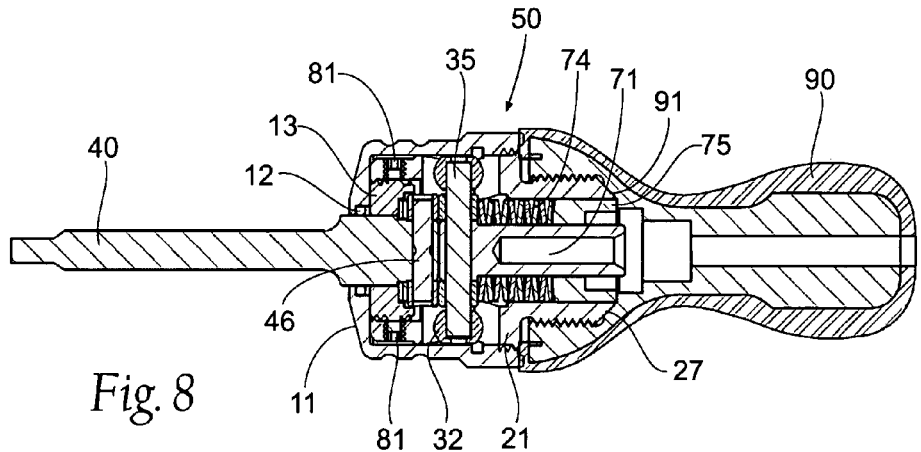
Fig. 8
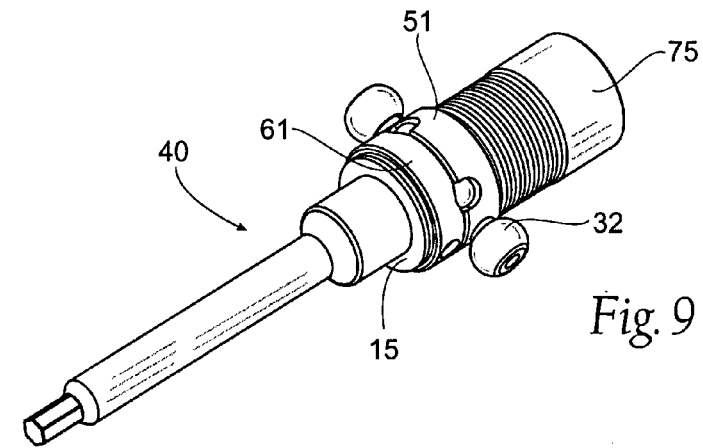
Fig. 9
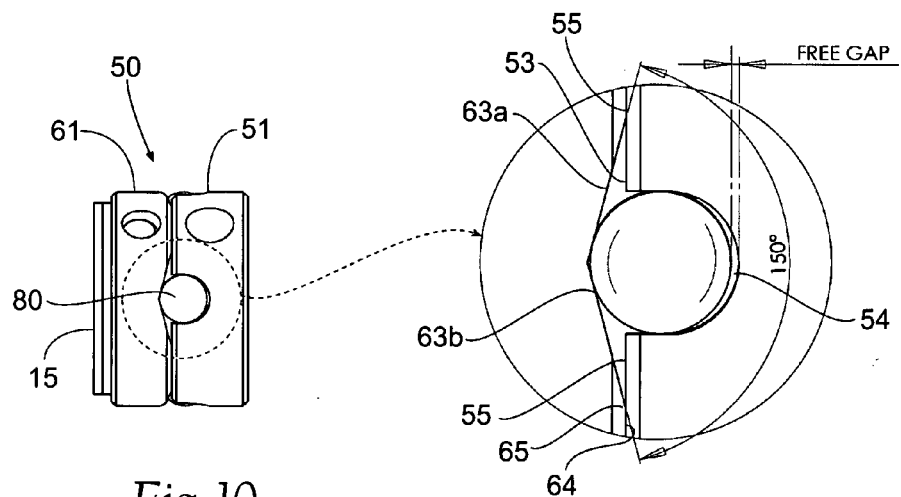
Fig. 10
Fig. 11

FIXED TORQUE LIMITING DRIVER

BACKGROUND OF THE INVENTION

The present invention relates to mechanical drive devices, and, more specifically, to drive devices that will limit the torque being delivered from the device.

Many mechanical devices are used to deliver a large amount of torque to a screw, bolt, nut, or other similar device or object. Even though there is a large amount of torque being delivered, in many situations, it is still desirous to control the precise amount of torque being delivered. For instance, too much torque may strip the object that is being driven, which would lead to the object becoming ineffective, such as stripping a bolt or screw. This is especially important in medical operations and procedures, where precision is critical, especially when working with spinal and skeletal structures and related devices. Thus, drivers have been developed to limit the amount of torque delivered to the driven object or device.

Likewise, improperly calibrated or tensioned devices can also do damage if too much torque is delivered or, conversely, will be ineffective if the tension in the device is too low. Such is the case when working parts of the device become worn, or do not hold a consistent torque after several uses, which can occur in the prior art.

Generally, such torque limiting drivers use ball bearings placed between two clutch plates or between a cam plate and a drive plate. The bearings assist the plates in sliding against one another within a grooved slot formed by the two plates, with the slot having varying depths. As torque is increased with the driver, the ball bearings will slide within the groove. When the torque reaches a maximum, the bearings will be forced into a resting area that prevents the two plates from providing any further torque to the driven object.

Other arrangements include pawls or ramped arrangements. As the torque is increased on the driver, the bearing will move up the ramp until it reaches the top of the ramp, whereby further torque delivery will cause the bearing to move to a resting area, as in the arrangements above.

While these devices limit the amount of torque being delivered, these drivers can take a lot of abuse, especially on the bearings themselves. Especially with medical applications, the amount of torque needed to be delivered can be several hundreds of pounds of pressure. When these devices trigger a torque cut-off when the maximum torque is reached, the two plates will sandwich the bearings, exerting a large amount of pressure on the bearings. This smashing action of the bearings can cause damage to the bearings, which results in the effectiveness of the driver being diminished. This is not desirous for equipment requiring a high-level of precision, especially when the equipment can be rather expensive.

Examples of such drivers may be found in Leonard, et al., U.S. Pat. No. 3,942,337 and Girguis, U.S. Pat. No. 5,035,311. While these devices may effectively limit the torque delivered by the disclosed device, they have a tendency to deliver unneeded forced on the rolling members located between the clutch members, which limits the effectiveness of the device and, also, the consistency of the torque limit being delivered by the device.

Thus, it would be advantageous to design a torque limiting driver that would minimize damage to the moving parts of the driver.

SUMMARY OF THE INVENTION

The present invention provides a clutch assembly for use with a torque limiting driver. Generally, the clutch assembly comprises two clutch plates, one being a driving plate and one being a camming plate, that face one another. The driving clutch member has a face comprising a plurality of radially spaced flat areas and a plurality of recesses interposed between said flat areas, with the recesses comprising a curvilinear base area. The second camming clutch member has a face comprising a plurality of radially spaced flat areas and a plurality of opposing downwardly sloped planar surfaces interposed between said flat areas, with the planar surfaces forming an angle.

The first and said second clutch members are relatively rotatable to one another, with a plurality of rolling members housed between the two clutch members. The rolling members are movable from an engaged position with the clutch members to an override position. When the rolling members are in the override position, the recesses in the driving plate form individual housings for the rolling members that include a gap located between the rolling members and a respective curvilinear base area. The arrangement provides for an overall assembly having an improved useful life compared to prior art designs.

The overall assembly is also designed for ease of assembly and minimizing stress on the driver. For instance, the clutch assembly is connected to a handle of the driver by way of an insert. The insert and the handle have mating surfaces, preferably surfaces angled at 45°, which allows for easy alignment and connection of the handle and the insert. Also, the pin and locking member used to connect the clutch assembly with the insert is designed to limit the stress on the interacting parts when the device is in use. The result is a longer life for the device. These and other advantages will become further evident in view of the detailed description and the drawings.

BRIEF DESCRIPTION OF THE DRAWINGS

FIG. 3 is a perspective view of a driver insert in accordance with the present invention.

FIG. 4 is a side elevated view of the driver insert of FIG. 3.

FIG. 5 is a cross-sectional view of the driver of FIG. 4 taken along the line 5-5 of FIG. 4.

FIG. 6 is a close-up view of sectional view of the area delineated as a broken circle in FIG. 5.

FIG. 7 is a front perspective view of the driver insert of FIG. 3.

FIG. 8 is a longitudinal cross-sectional view of a driver in accordance with the present invention.

FIG. 9 is a front perspective view of the torque limiting member of the present invention.

FIG. 10 is a side elevation view of the clutch/bearing mechanism of the present invention.

FIG. 11 is a close-up sectional view of the mechanism of FIG. 10 delineated by a broken circle in FIG. 10.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
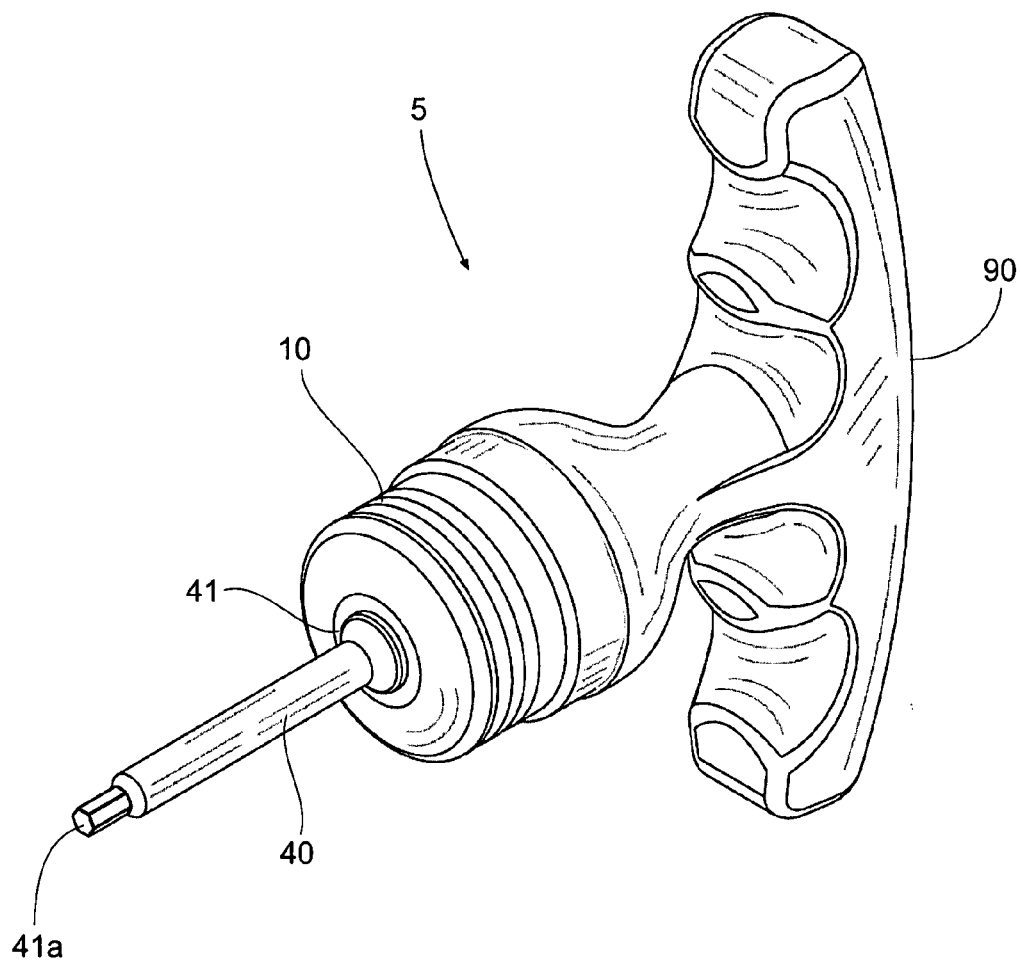
FIG. 1 is a perspective view of a driver in accordance with the present invention.

FIG. 1 is a perspective view of a torque limiting driver assembly 5 in accordance with the present invention. The assembly 5 generally consists of a handle 90, a torque limiting driver 10, and a bit or other attachment 40 comprising a shaft 41. The shaft 41 ends in a proximal end 41a, which is arranged to interact with a bolt, nut, socket, screw, or other similar devices. As shown, the proximal end 41a of the bit 40 is designed as a hexagon for use as an Allan wrench type device. However, it is understood that the shaft 41 could be of any useful mechanical structure that would be used to deliver torque on an object and still fall within the scope of the present invention.

Figure 2:
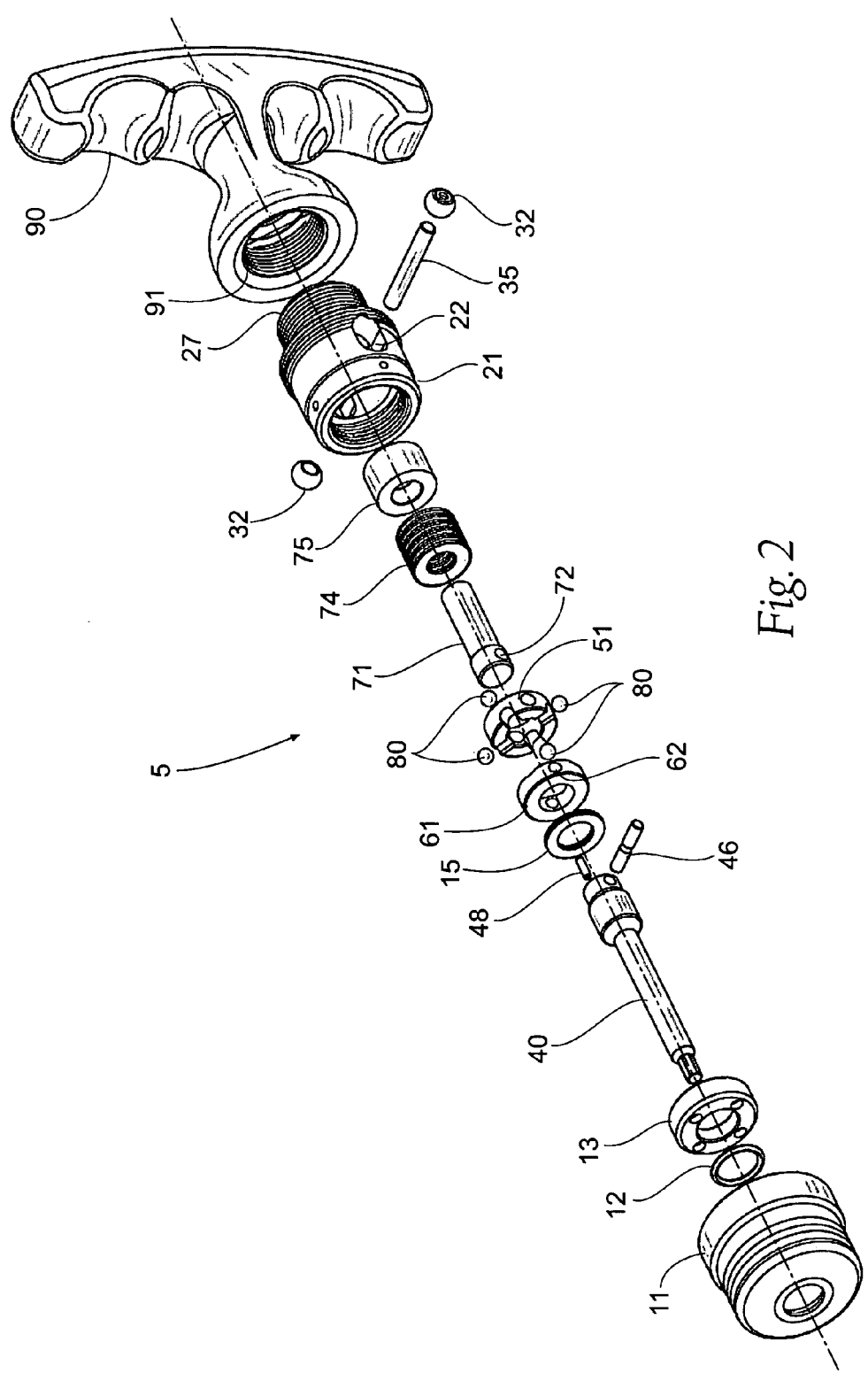
FIG. 2 is an exploded view of the driver of FIG. 1.

FIG. 2 provides an exploded view of the driver assembly 5. Generally, a cap 11 is connected to the handle 90 by way of an insert 21, which couples the cap 11 to the handle 90, preferably by threading the cap 11 and the handle 90 to the insert 21. The various other elements will be secured within the assembly relatively between cap 11 and the handle 90. The cap 11 houses an O-ring 12 and a locking screw 13, with the bit 40 being inserted into the cap 11. The bit 40 is buttressed against a first clutch member or a cam 61 with a washer 15, further utilizing a pin 46 and a spring pin 48 to couple the cam 61 to the bit 40. The arrangement will be discussed further with respect to FIGS. 17-21.

Still referring to FIG. 2, the first clutch member 61 interacts with a second clutch member or driver 51, with a plurality of rolling members 80 located between the two clutch members 61, 51, thereby forming a clutch assembly 50, which is the main focus of the present invention and will be discussed more particularly with respect to FIGS. 10-14.

The second clutch member 51 is further coupled to a drive shaft 71 by way of a pin 35 inserted through hole 72, located on the drive shaft 71, and hole 56, located on the second clutch member 51. The pin 35 is further secured by way of a pair of wheels 32, which will be shown in more detail with respect to FIGS. 3-7. The drive shaft 71 is further inserted through a helical spring 74 and spacer 75, which assists in providing the necessary tension for the assembly 5. The helical spring 74 and the spacer 75 provide the necessary biasing means for the clutch member 51 with respect to the drive shaft 71 and other elements of the assembly 5. However, it is understood that other devices, such as disc springs, Belleville washers, or other known devices may be used as biasing means and these devise would still fall within the scope of the present invention.

Referring now to FIGS. 3-7, an insert assembly 20 is shown. The insert assembly 20 generally comprises the bit 40 and the insert 21, which are coupled together, preferably with a plurality of set screws 81. The screws 81 interact with the locking screw 13, which holds together the insert 21 and the bit 40. Preferably, four set screws 81 are symmetrically arranged and are used to secure the insert assembly 20, but any number of screws may be used and, further, other fastening or joining devices may be used.

As shown and described in FIG. 2, the insert 21 is inserted into the handle 90. The insert 21 has a chamfered surface 27, which will mate with an opposing surface 91 located on the handle 90. In FIGS. 3 and 4, the chamfered surface 27 is preferably designed to be at a 45° with respect to a central longitudinal axis X of the driver assembly 5 and the insert assembly 20. The opposing surface 91 is also preferably designed to be at a mating 45° with respect to chamfered surface. This arrangement assists in securing the insert assembly 20 to the handle 90, by automatically centering the assembly 20 with the handle 90, which prevents the assembly from being cocked or misthreaded when being attached to the handle 90.

FIGS. 5-7 further depict the insert 21 and the interaction with the wheel 32. The wheel or wheels 32 reside within a respective housing 22, which has opposing sides 28, which interact with the wheel 32 in the same fashion. The arched surface 33 of the wheel 32 are in a tangential relationship with the sides 28, regardless of whether the pin 35 may rotate or not, or even if the angle of the pin 35 may change. This is an important feature that prevents unnecessary wear on the wheels 32 against the housing 22, as the outward force is generally constant in all outward directions. The arched surface 33 also assist in keeping the proper tension needed for consistent torque delivery by the assembly 5. When the driver 5 is in use, force will be delivered in two directions, twisting force of the individual clutch members 51, 61 of the clutch assembly 50 working against each other, and the backwards force opposite the axial driving force of the assembly 5. As such, the wheel 32 acts as a bearing in response to these forces. Prior art arrangements used hexagonal nuts in place of the wheels 32 of the present invention. However, such nuts are not the most efficient in counteracting the backwards force delivered by a driver assembly, as they do not evenly disperse the force within the housing. This leads to unnecessary wear on the nuts and, consequently, diminishes the usefulness of a driver assembly. As the nuts wear down, the precision of the clutch assembly 50 will be diminished, as the specific plates will have more play than needed when interacting. The arched surface 33 of the wheels 32 provides an even bearing surfaced against the housing 22, and thereby minimizes any deleterious effects associated with the force delivered by the driver.

FIG. 8 provides a cross-sectional view of the assembly 5. As previously discussed, the handle 90 is coupled to the cap 11, with the various elements of the assembly 5 secured within. The cap 11 secures the bit 40 in place, which, as previously described, is coupled to the insert 21 by way of the locking screw 13. The bit 40 is further sealed within the locking screw 13 with the o-ring 12. As discussed previously, the clutch assembly 50 sits between the bit 40 and the insert 21, with the pin 35 allowing the assembly 50 to be attached to the insert 21. The various elements are joined together, with the spacer 75 and the spring 74 further contributing the necessary tension for the assembly 5. The spacer 75 assists in connecting and properly biasing the insert 21 to the clutch assembly 50. Further, as noted, the angle of the chamfered surface 27 allows central alignment of the handle, the shaft 71, and the bit 40, and the other elements of the assembly 5.

Referring to FIGS. 10-14, the clutch assembly 50 is shown in greater detail. The arrangement and design of the clutch assembly 50 are important features of the present invention. The first clutch member or cam 61 and the second clutch member or driver 51 are relatively rotatable to one another and house a plurality of rolling members 80 between the clutch members 51, 61. The surface of the clutch members 51, 61 is designed to prevent unnecessary stress and force on the rolling members 80 when torque is applied to the clutch assembly 50, thereby prolonging the life of the assembly 50 and the drive assembly 5. That is, the compression on the rolling members 80 is limited in the present invention, thereby minimizing the stress on the rolling members 80 when using the assembly 5. The rolling members 80 could be of any shape or size that would allow for smooth movement, such as spherical-shaped, cylindrical shaped, or possibly conical shaped members.

FIG. 11 shows a close-up view of the clutch assembly 50 of FIG. 10. The rolling member 80 is housed between the clutch members 51, 61, with the rolling member 80 resting along a pair of downwardly sloped planar surfaces 63a, 63b located on a face 65 of the clutch member 61. The planar surfaces 63a, 63b form an angle, which is conducive to smooth movement for the rolling member 80, thereby minimizing damage to the rolling member 80. The face 65 further comprises flat areas 64, with the planar surfaces 63a, 63b interposed between the flat areas. The second clutch member 51 also has a face 53 that opposes the face 64 of the first clutch member 61. The face 53 comprises a plurality of curvilinear recess 54 having a radius R interposed between a pair of radially spaced flat areas 55. When the flat areas 64 and 55 are generally aligned, the rolling member 80 will be in the position shown in FIG. 11. The position can be considered the override or resting position for when the assembly 5 is not producing any torque or driving force. As you will notice, a free gap is located between the rolling member 80 and the curvilinear recess 54. The free gap prevents the rolling member 80 from being driven into the second clutch member 51, thereby minimizing the damage to the rolling member 80 and prolonging the life of the clutch assembly 50. To accomplish this, the arrangement of the surfaces 63a, 63b and the radius R of the recess 54 is designed for this specific purpose. Preferably, the surfaces 63a, 63b form a specific predetermine angle, preferably an obtuse angle greater than 120°, with a most preferred angle being approximately 150°. The obtuse angle arrangement provides for a minimal amount of stress on the clutch assembly 50 that competes with the driving force of the overall assembly 5 when in use. This arrangement greatly enhances smooth, gradual movement of the rolling member 80 and increasing the life of the assembly 5. Similarly, the angle is designed so that it is not too large of an angle, which would diminish the effectiveness of the assembly 50 by not providing enough substantive resistance between the clutch members 51, 61 and the rolling members 80.

Figure 12:
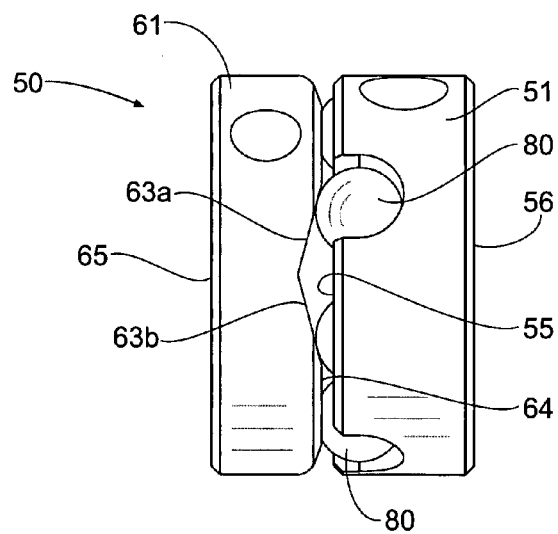
FIG. 12 is a side elevation view of the mechanism of FIG. 10 shown in a second position.

FIG. 12 shows the clutch assembly 50 with the clutch members 51, 61 being rotated with respect to one another. The rolling member 80 is rolled upwardly along the surface 63a. If the torque or driving force is increased, the rolling member 80 will ride on the flat area 64, which represents the maximum torque delivered by the assembly 5. At that point, the rolling member 80 will slide down an adjoining surface 63b (see FIG. 14) to return to the resting or override position of FIG. 11. However, because the gradual slope of the surfaces 63a, 63b in combination with radius R of the curvilinear surface 54, the rolling member 80 will not be compressed into the clutch members 51, 61, because of the free gap between the rolling member 80 and the clutch member 61, thereby greatly increasing the life of the clutch assembly 50. It is understood that the assembly can operate in a forward or reverse direction as is necessary.

Figure 13:
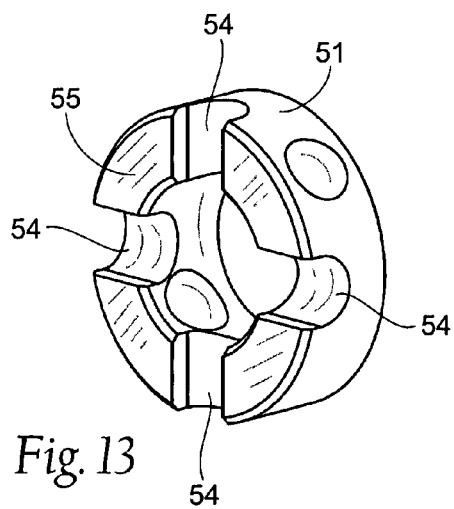
FIG. 13 is a perspective view of driver plate used in the present invention.
Figure 14:
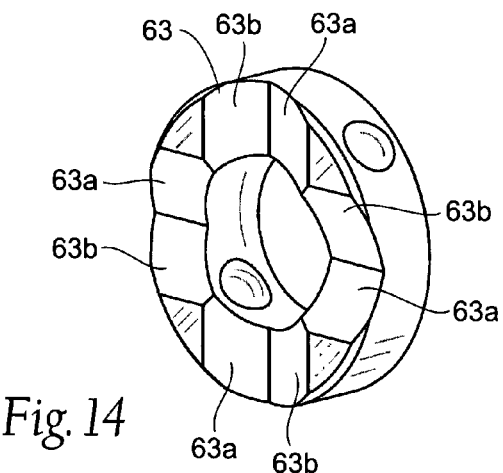
FIG. 14 is a perspective view of a cam plate used in the present invention.

Referring to FIG. 13, a perspective view of the driving clutch member 51 is shown. Preferably the recesses 54 and the flat areas 55 are symmetrically designed. Similarly, the flat surfaces 64 and the downwardly sloped surfaces 63a, 63b are also symmetrically arranged. Furthermore, as is evident in FIGS. 11, 13, and 14, the total width of the angle formed by the surfaces 63a, 63b, or an arc associated with the angle formed by sloped surfaces 63a, 63b, is greater than width of the individual recesses 54, which further contributes to the novelty of the present assembly 5. The dimensions contribute to the rolling member 80 to move smoothly and gradually when torque is applied to the clutch assembly 50, improving the effective life of the assembly 5. As previously stated, the rolling members 80 may be of various sized and dimensions.

Figure 15:
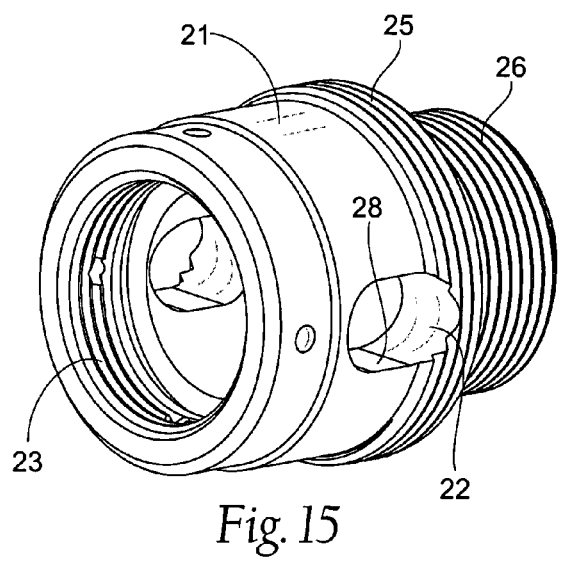
FIG. 15 is a close-up perspective view of a driver insert used in the present invention.
Figure 16:
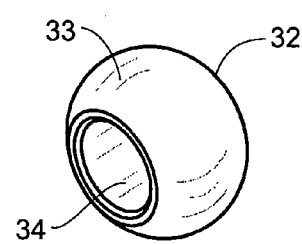
FIG. 16 is a perspective view of an adjustment wheel used in the present invention.
Figures 17, 18:
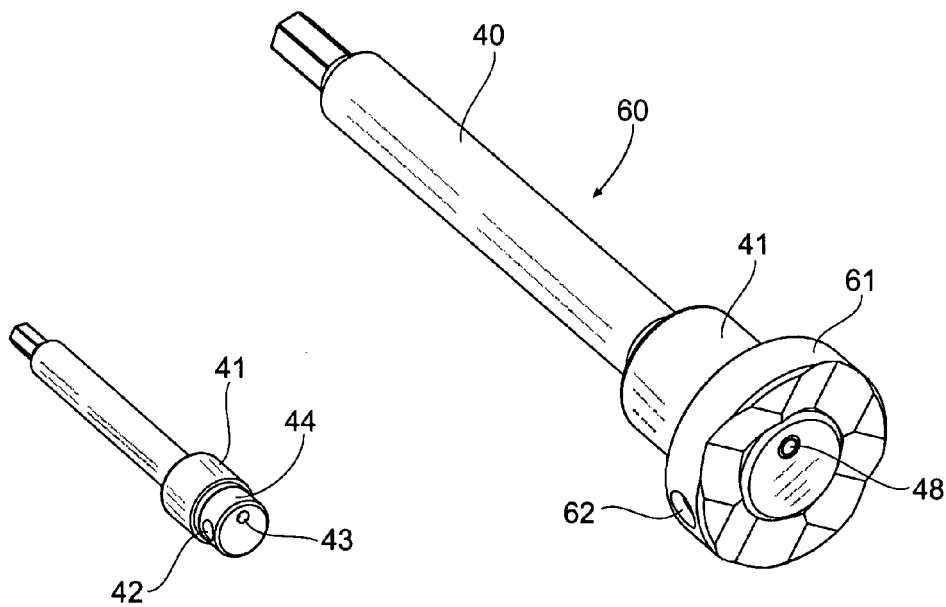
FIG. 17 is a perspective view of a work bit used in the present invention.
FIG. 18 is a perspective view of the work bit of FIG. 17 coupled with the cam plate of FIG. 14.
Figure 19:
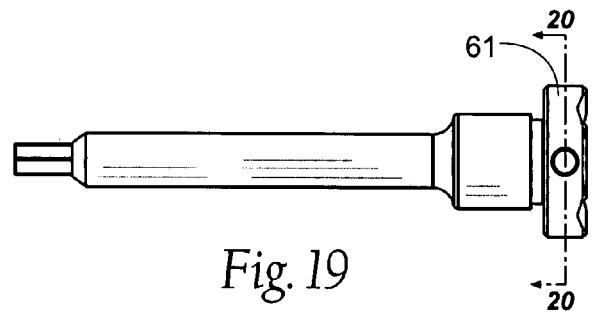
FIG. 19 is a side elevation view of the work bit and cam plate of FIG. 18.

FIG. 15 provides a perspective view of the insert 21, which, as previously stated, connects the handle 90 to the other various sections of the assembly (see FIG. 8). The insert 21 is arranged to tightly and securely attach various parts of the assembly, while still providing ease of assembly. For instance the threaded sections 23, 25, and 28 allow for simple connection to other sections of the assembly. Likewise, the slot 22, along with the surface 28 allows for easy interaction with the wheel 32 and the arched surface 33 of the wheel (see FIG. 16). The slot 22 and the wheel 32 are an improvement over the prior art by providing a bearing arrangement that will evenly disperse force when the assembly 5 is in use. The various parts are designed precisely to insure a properly fitting and functioning assembly 5.

Figures 20, 21:
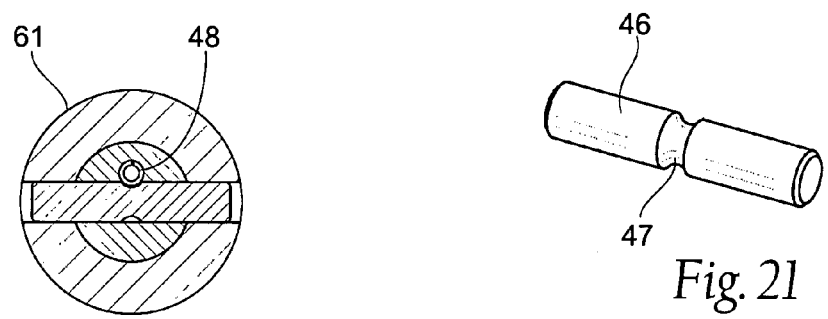
FIG. 20 is a cross-sectional view of the arrangement of FIG. 18 taken along line 20-20 of FIG. 19.
FIG. 21 is a perspective view of a pin used to secure the work bit and the cam plate shown in FIGS. 18-20.

FIGS. 17-21 show various views of the bit 40 and shaft 41 attached to the camming clutch member 61. The camming clutch member 61 sits fittingly around the outside diameter of an upper section 44 of the shaft 41. As shown in FIG. 20, the pin 46 sits within the hole 42, thereby connecting the camming member 61 to the shaft 41. A groove 47 (see FIG. 21) allows the locking pin 48 to securely hold arrangement together by being inserted into the hole 43. The groove 47 on the pin 46 is an improvement over prior art designs, which required a locking pin to be compressed to hold the specific sections in place, which often causes the pin to snap. The present pin 46 minimizes such compressive forces, thereby increasing the life of the pin 46 and the overall assembly 5. The connection may be quickly accomplished, yet provides sufficient strength and stability for the high levels of torque applied when using the assembly 5.

Thus, the present invention provides a tool and clutch member that can deliver a high amount of torque, while minimizing the damage of the various parts of the tool. Because the rolling members 80 are not subjected to a high compression force when moving to an override position after an upper torque limit is exceeded, the useful life of the driver is extended compared to prior art devices. Similarly, the individual components, such as the wheels, are designed specifically to also reduce stress on the interacting parts, thereby providing a tool that has a precise, useful life for a longer time when compared to the prior art.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A torque limiting driver comprising:
   a handle;
   a drive shaft;
   an insert removably secured to said handle;
   means for coupling said drive shaft to said insert;
   a clutch assembly coupled to said drive shaft, said clutch assembly further comprising:
   a first driving clutch member having a face comprising a plurality of radially spaced flat areas and a plurality of recesses interposed between said flat areas, said recesses comprising a curvilinear base area;
   a second camming clutch member having a face comprising a plurality of radially spaced flat areas and a plurality of opposing downwardly sloped planar surfaces interposed between said flat areas, said planar surfaces forming an angle;
   said first and said second clutch members being relatively rotatable to one another;
   a plurality of rolling members housed between said first clutch member and said second clutch member, said rolling members being movable from an engaged position with said clutch members to an override position;
   said recesses forming a housing for said rolling members, wherein a gap is located therebetween each of said rolling members and a respective curvilinear base area when said rolling members are in said override position;
   a tool member coupled to said clutch assembly; and
   means for biasing said second clutch member relative to said first clutch member.

2. The driver according to claim 1 wherein said insert further comprises a chamfered surface, said chamfered surface interacting with a mating chamfered surface on said handle, thereby providing alignment means along a longitudinal axis of said driver.

3. The driver according to claim 2, wherein said chamfered surface on said insert comprises a 45° angle with respect to said longitudinal axis of said driver.

4. The driver according to claim 1 wherein said means for coupling said drive shaft to said insert further comprises:
   a pin intersecting said drive shaft and said insert; and
   a pair of wheel members located on opposing sides of said pin, said wheel members further securing said pin to said drive shaft and said insert.

5. The driver according to claim 4 wherein said wheel members are located within a respective slot located in said opposing sides of said insert, said wheels having an arched surface, said arched surface being in a tangential relationship with said slot, said wheel members providing bearing means for said clutch assembly.

6. The driver according to claim 1 further comprising:
   a pin having a groove; and
   a locking spring pin, said locking spring pin being arranged to interact with said groove on said pin, thereby coupling said tool member to said second clutch member.

7. The driver according to claim 1, wherein said formed by said planar surfaces angle is greater than approximately 120°.

8. The driver according to claim 7, wherein said angle is approximately 150°.

9. The driver according to claim 1, wherein the width of a pair of said opposing downwardly sloped surfaces is greater than the width of each of said recesses.

* * * * *

UNITED STATES PATENT AND TRADEMARK OFFICE
CERTIFICATE OF CORRECTION

| | |
|---|---|
| PATENT NO. | : 7,243,581 B1 |
| APPLICATION NO. | : 11/471308 |
| DATED | : July 17, 2007 |
| INVENTOR(S) | : Hua Gao |

It is certified that error appears in the above-identified patent and that said Letters Patent is hereby corrected as shown below:

Column 8, line 35, insert the following claim (following claim 9):

--10. The driver according to claim 9, wherein said angle is approximately 150°.--

Signed and Sealed this

Eighth Day of December, 2009

David J. Kappos
*Director of the United States Patent and Trademark Office*